INVENTOR
BORGE R. ANKERSEN

Attorneys

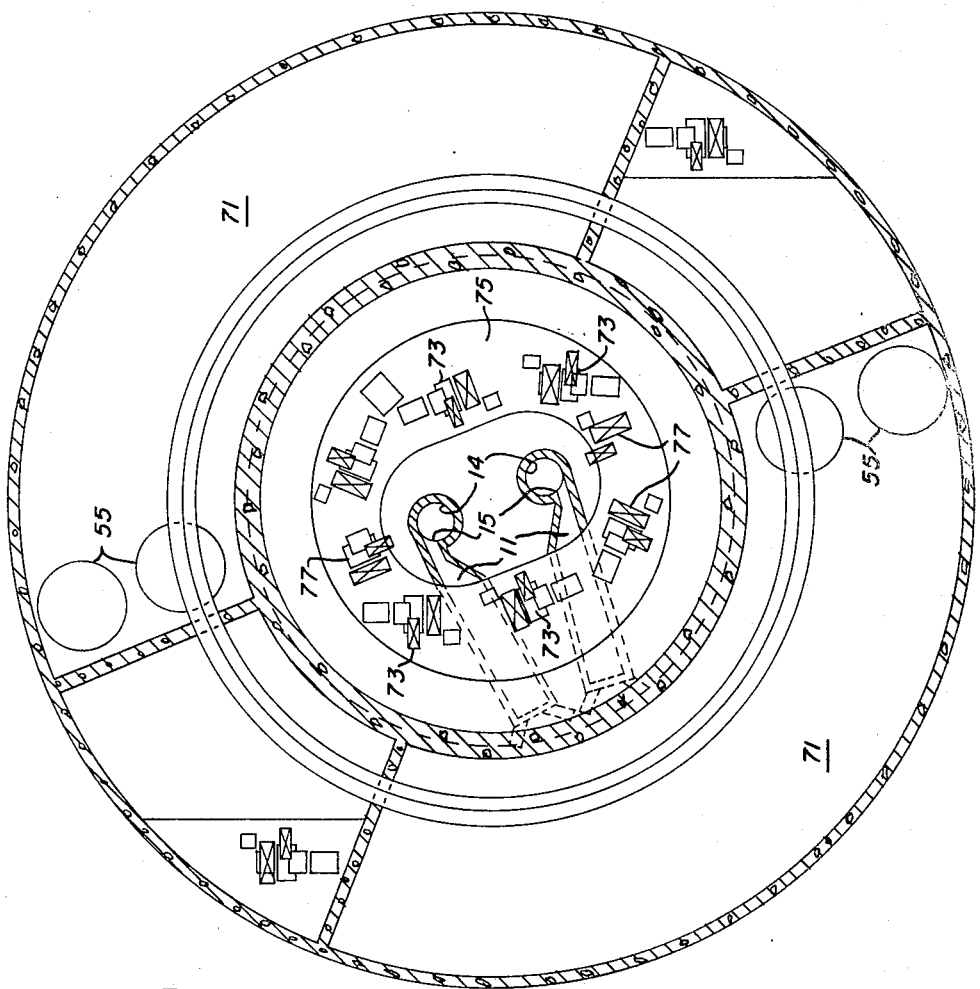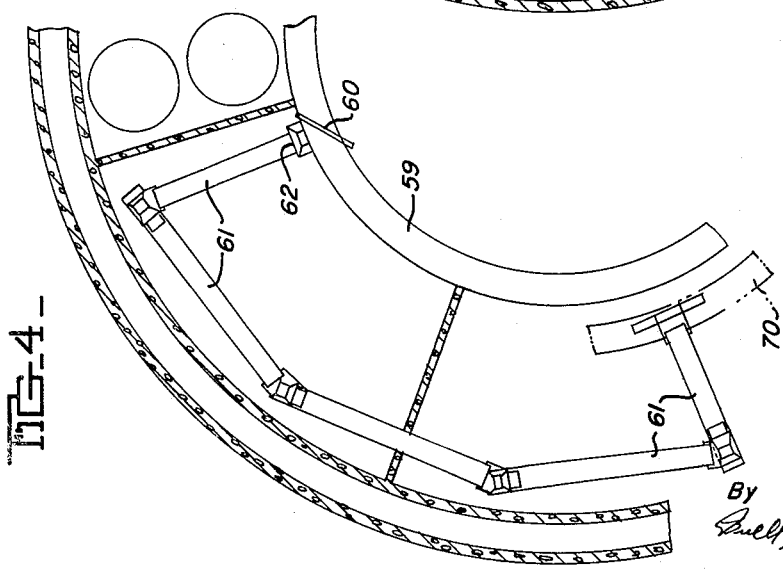

United States Patent Office 3,507,232
Patented Apr. 21, 1970

3,507,232
INCINERATING APPARATUS AND METHODS
Borge Richard Ankersen, 2420 Private Drive,
Pontiac, Mich. 48055
Filed July 15, 1968, Ser. No. 744,842
Int. Cl. F23g 5/12
U.S. Cl. 110—8                                      5 Claims

ABSTRACT OF THE DISCLOSURE

An incineration apparatus and method are provided having a main horizontal combustion chamber converging at its discharge end into a reduced cross-section throat discharging tangentially into the base of a vertical secondary combustion chamber, means for axially introducing refuse together with preheated air are provided adjacent the top of the main combustion chamber, means connected to said main combustion chamber for introducing high calorific fuel into the main combustion chamber, means for introducing preheated air under pressure tangentially into the main combustion chamber and means for discharging molten residues from both combustion chambers.

---

This invention relates to incinerating apparatus and methods and particularly to an apparatus for shredding and burning garbage and refuse.

The problems of disposing of garbage and refuse have become critical in many urban areas. Practices heretofore used have proven inadequate to satisfactorily solve these problems. Various forms of incineration apparatus have been proposed. However, such apparatus have not proven satisfactory for various reasons. Most such apparatus do not completely consume the garbage leaving damp residues which must be later disposed of by land fills or other means.

I have invented an incinerating apparatus and method of incineration, based upon the concept of shredding the garbage and refuse to a generally uniform size and then injecting this uniformly sized garbage and refuse pneumatically suspended in preheated air into a high temperature cylindrical combustion chamber with its axis nearly horizontal while feeding a high calorific fuel into various predetermined locations of this combustion chamber, subsequently subjecting the injected stream of shredded refuse to a very high velocity stream of secondary preheated air at a 90 degree angle to the direction of travel of the refuse, causing a great turbulence of the secondary air and the injected material and simultaneously forcing the material and air into a high velocity spirally rotating path, within the cylindrical combustion chamber.

As a result of the high temperature within the furnace and the impingement upon the injected material stream by the flames from the high temperature gas burners at the entrance into the furnace, the injected material will ignite extremely rapidly and due to the very turbulent mixing of this material with the preheated secondary combustion air, an extremely violent combustion activity will take place. Since there will be a deterioration of the flow pattern of the first injected preheated secondary air, several other sets of secondary air injection ports are provided down stream in the helical gas flow pattern within this primary combustion chamber.

While this high level of combustion activity is maintained along a spiraling path within the combustion chamber, the non-combustible materials will melt due to the high temperature maintained within the combustion chamber. These molten non-combustible materials will form a molten slag which, due to the very high angular gas velocity will be forced against the hot refractory walls by the centrifugal force and form a layer of molten slag covering the refractory walls and gradually running down to the bottom of the combustion chamber and then proceed by gravity lengthwise along the slightly inclined bottom of the combustion chamber to the slag tap-out located at the bottom of the vertical axis cylindrical furnace section later referred to as the secondary combustion chamber. While the non-combustible materials are being collected centrifugally in this manner within a fraction of a second after they have been injected into the combustion chamber the furnace actually functions as a high temperature wet collector, the molten slag acting as the liquid, collecting the would-be fly ash particles from the very beginning of the combustion process rather than producing more fly ash particles as is the case in all other incinerating operations.

The injected combustion air and gases which expand during the combustion process in the primary combustion chamber to approximately five times their original volume are exhausted from the primary combustion chamber through a rectangular throat section, tangentially into the base section of a vertical axis secondary combustion chamber at a very high velocity. The extremely high centrifugal force created by the high velocity swirling of these gases within the cylindrical walls of the secondary combustion chamber forces most of the particulates remaining in suspension in the combustion gases against the walls of the secondary combustion chamber where these molten particulates will form a slag and run down and out through the slag tap-out hole as previously described for the primary combustion chamber. Due to the very high gas velocity at this point—in excess of 500 feet per second—it is expected that essentially only particles of 15 micron size or less will be capable of remaining in suspension in the flue gases beyond this point as the gases proceed up through the vertical section of the secondary combustion chamber and then through the heat exchanger and scrubber.

Although it has been established conclusively by full scale tests that more than 98% of the injected material is sufficiently light in weight to remain in suspension in the air stream during the combustion period, it is recognized that some of the remaining 2% will have a tendency to drop to the bottom of the combustion chamber and complete its combustion in this location without actually being airborne. It is expected that the majority of particles of this density will fall in the area in front of the second pair of hot air injection nozzles where these will provide this material with agitation and combustion air to facilitate very rapid combustion and thereby eliminate any excessive accumulation of this type of material.

As will be readily recognized from the preceding description this invention provides a new type of furnace for the incineration of refuse materials of an extremely wide variety and range with two very important fields of improvements over the prior art.

The first field of improvements is concerned with the efficiency of combustion, providing for absolutely complete combustion of all organic materials injected into the furnace while maintaining a heat release within the primary combustion chamber of approximately 10 times the combustion intensity maintained in even the most modern of the previously built incinerating furnaces.

The second field of improvements relate to the generation of fly ash during the combustion process and the effort to keep these fly ash particles from remaining in suspension in the hot flue gases as they proceed through the furnace.

Since all presently existing incinerating furnaces burn the refuse on a grate, they all produce large quantities of fly ash by the very nature of air supply to the burning material. Since these furnaces have no capabilities whatever in the way of restricting the formation of fly ash nor keeping the formed fly ash from remaining in suspension in the flue gases, they all impose a very heavy load on the various types of flue gas cleaning equipment following the furnace exhaust ducts, thereby presenting an extremely difficult task for the air pollution control equipment to maintain the particulate content in the emitted flue gases from the operation, below the legislated limits. In strong contrast to this type of operation, my furnace produces a much smaller quantity of fly ash during its highly efficient combustion process, and the non-combustible particles which could still be fly ash are immediately melted and collected on the furnace walls as molten slag by a double cyclonic collection process which has heretofore never been utilized for any flue gas cleaning process. This results in a much lighter dust loading in the flue gases being presented to the air pollution control equipment with particle size being limited to the relatively narrow range below approximately 15 micron size. This feature greatly simplifies the air pollution control problem and therefore assures an extremely clean and non-objectionable operation from an air pollution standpoint.

Preferably, I provide a refuse receiving station adjacent the furnace, a shredder means receiving refuse from the receiving station to shred the same, a source of high pressure air carrying dust and lighter shredded particles from the discharge point of the shredder to the intake hopper of the furnace, and a vibrating feeder means below the discharge of the shredder to mechanically convey the shredded particles too heavy for conveyance by the pneumatic conveying system, to a mechanical belt conveyor carrying these particles to the furnace intake hopper. Interspersed between the vibrating feeder means and the mechanical belt conveyor means is a magnetic separator means for separating the ferrous particles out of the general material flow into separate bucket conveyor means to carry these shredded ferrous particles to a waiting truck on the operating floor above. The non-ferrous materials, combustible or non-combustible, are discharged through the furnace charging hopper into a rotary air lock feeder from which it is injected into the primary combustion chamber of the furnace by air from a source of high pressure preheated air.

As these shredded materials are introduced into the furnace, the combustible materials burn and completely disintegrate and the non-combustibles melt and form a molten slag which by gravity flows along the sloped bottom of the combustion chamber to the slag tap-out hole from which a stream of molten slag is continually discharged into a slag quench tank. Here a large volume of continually recirculated water cools and shatters the slag and continually forms granulated slag particles which are continually discharged from the slag quench tank by screw conveyor means installed permanently at the bottom of the slag quench tank. The screw conveyor means continually discharges the granulated slag onto a bucket conveyor which in turn continually deposits the granulated slag in a truck located on the operating floor above.

As the trucks discharge their loads of refuse onto the receiving conveyor, clouds of dust and odor are emitted and tend to whirl upward toward the operating floor and the surroundings of the plant. As this dust reaches the upper edges of the receiving hopper, high velocity air intakes at this location entrain the dust and odor particles, thereby arresting their upward flow. This dust and odor-laden air is thereafter carried through a cyclone type dust collector and a wet scrubber and finally ducted to the intake side of the combustion air blowers from where it is through the combustion air heaters injected into the furnace and burned as combustion air.

In the foregoing general statement of my invention I have outlined certain objects, purposes and advantages of my invention. Other objects, purposes and advantages will be apparent from the consideration of the following description and the accompanying drawings in which:

FIGURE 4 is a horizontal section on line B—B of FIGURE 2; and

FIGURE 5 is a horizontal section on line C—C of FIGURE 2.

Figure 1:
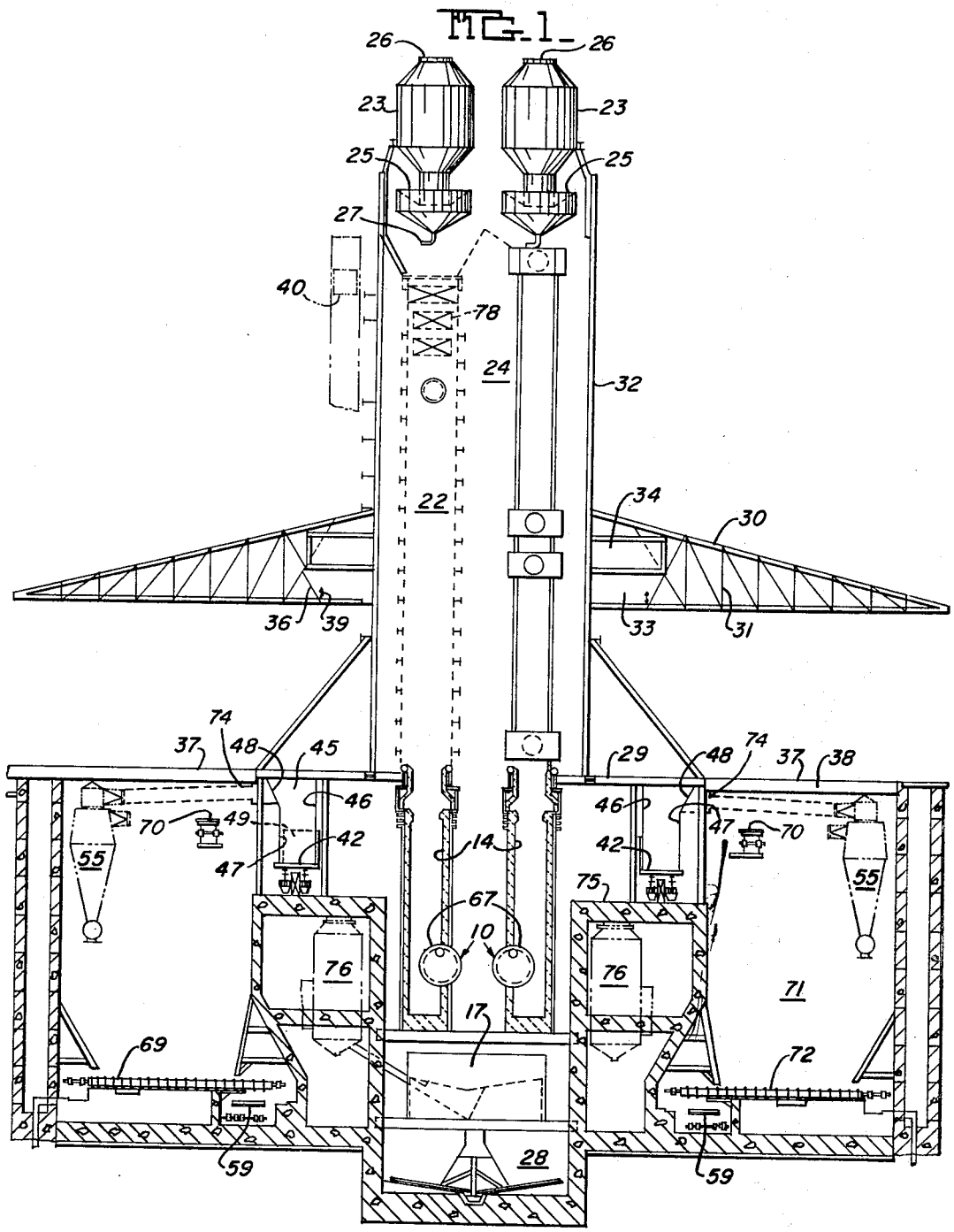
FIGURE 1 and FIGURE 2 are vertical sections 180° apart through an incinerating plant according to my invention.
Figure 2:
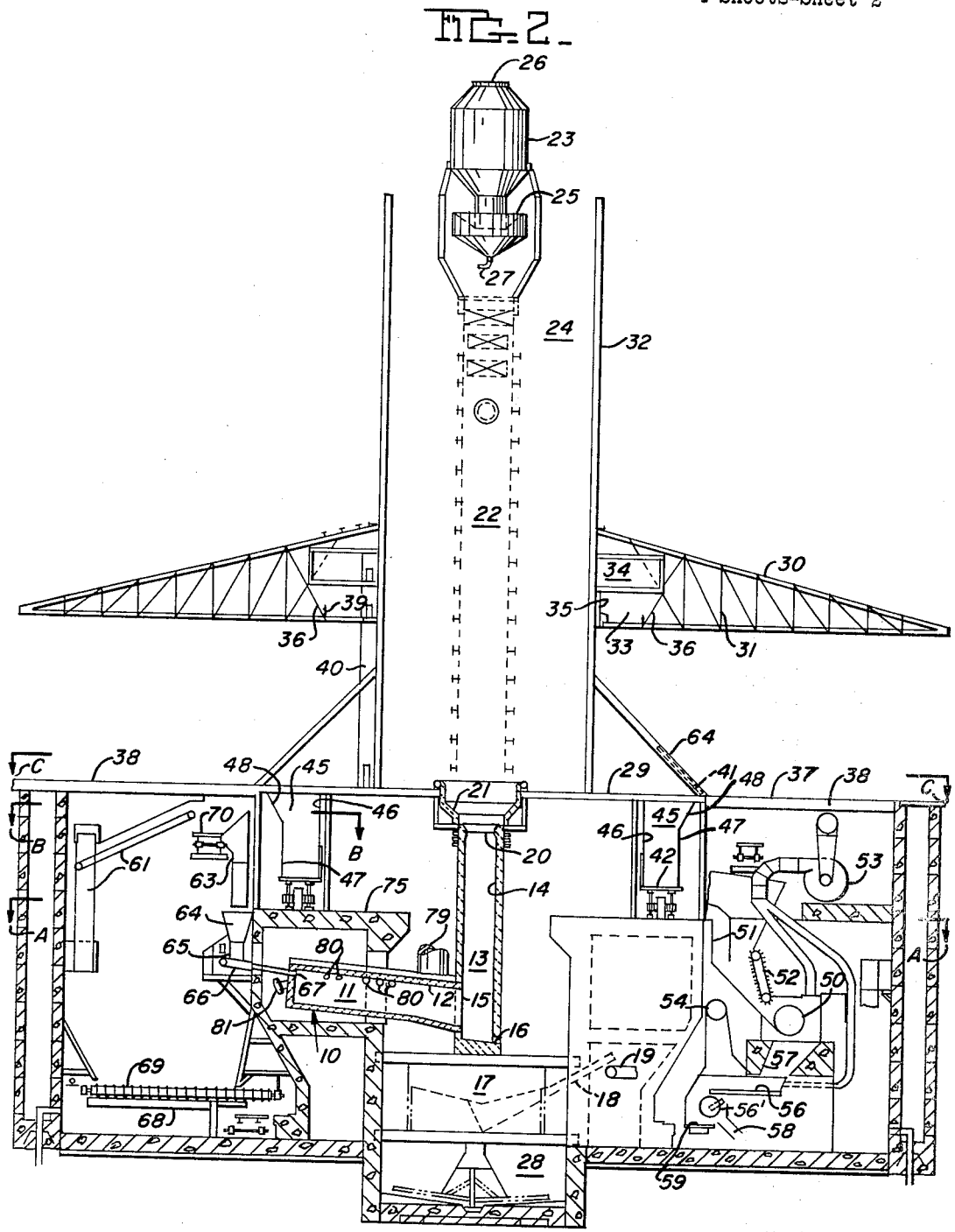
Figure 3:
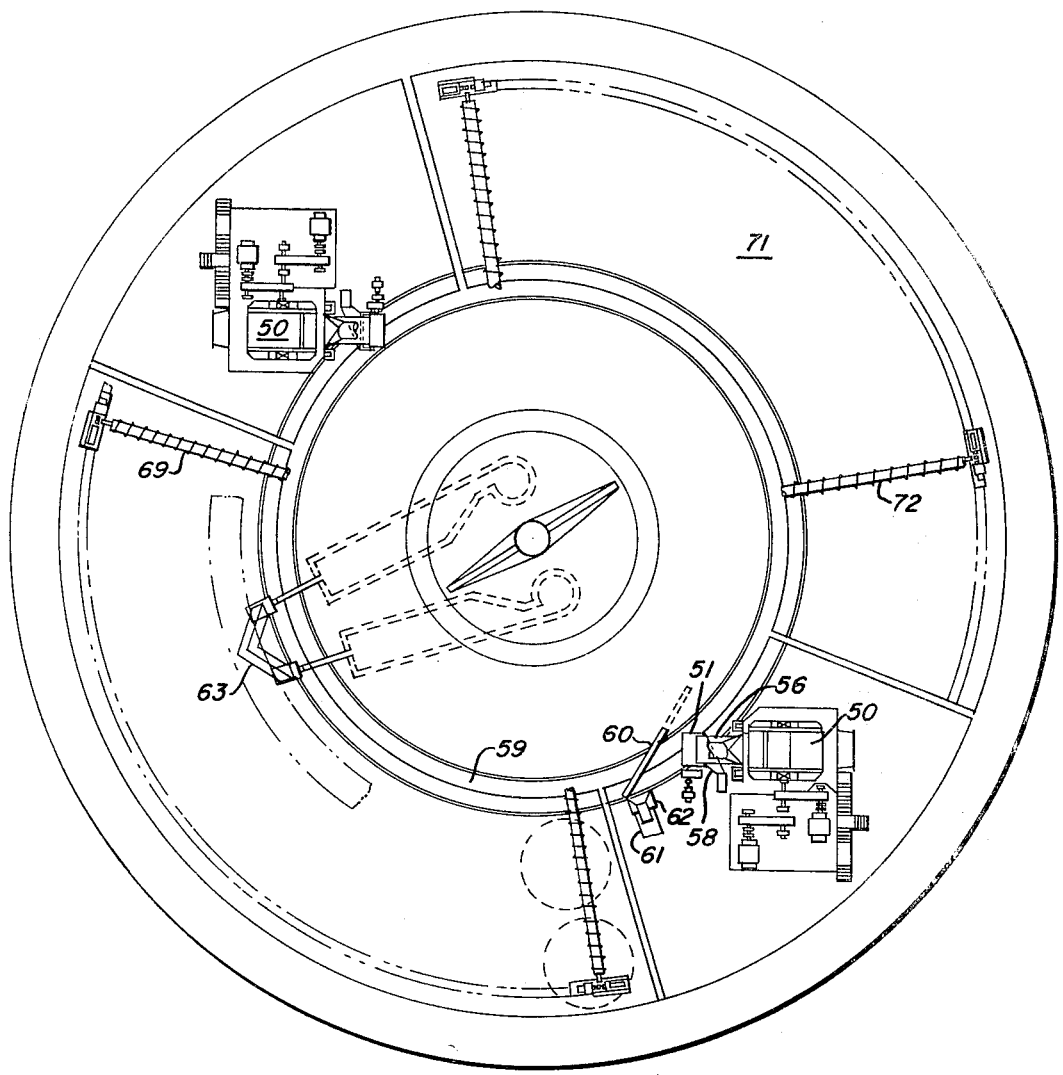
FIGURE 3 is a horizontal section on line A—A of FIGURE 2.

Referring to the drawings I have illustrated an incinerating plant which consists of a furnace 10 with primary combustion chamber 11 preferably generally cylindrical and on a horizontal axis surrounded by cylindrical refractory walls 12, tangentially oined to the base of secondary combustion chamber 13 having a vertical axis surrounded by cylindrical refractory walls 14. Combustion chambers 11 and 13 are joined at the rectangular throat section 15. At the base of secondary combustion chamber 13 is slag tap-out hole 16 through refractory lined walls 14, providing for the discharge of the molten slag residue from the combustion process into the slag quench tank 17 below. The quench tank 17 is provided with a screw conveyor 18 which discharges the quenched granular slag into conveyor 19 for delivery of the slag to conventional bucket elevator means which carries the granular slag to a waiting truck on the operating floor above. Secondary combustion chamber 13 terminates at the top in throat section 20 leading into refractory lined expansion section 21 at the base of high pressure steam boiler 22, which cools the flue gases from the furnace to approximately 600° F. prior to discharging them into high efficiency flue gas scrubber 23 with flue gas inlet 25 and discharge opening for flue gases 26. The scrubber is suspended directly above the boiler, within the confines of tower structure 24. At the bottom point of scrubber 23 is discharge pipe 27 for the discharge of fly ash contaminated water which is piped directly to slurry tank 28 at the bottom of the concrete foundation. The stack structure is surrounded by stack columns 32 which are supported at the bottom by floor beams 29. A circular roof 30 covers the entire operating area of the plant and is supported by roof trusses 31 which are carried by stack columns 32 around the stack.

Within the roof trusses is located a circular shaped control room 33 and administration offices 34. Control panels 35 mounted on the inner circular wall of control room 33 contain all electronic instrumentation for the operation of the plant. Occupying the entire outer wall of the control room are large windows 36 providing the operators of the plant with a full and unobstructed view of all of the activities on the operating floor 37 below. Recessed into the surface of operating floor 37 are twenty truck scales 38 reaching out radially from the outer edge of receiving hopper 45. Preventing the operators from inadvertently walking into windows 36 is guard rail 39. Elevator 40 leads from the operating floor 37 to control rooms 33 and administration offices 34.

Surrounding the furnace is an annular receiving hopper 45 defined by inner cylindrical steel wall 46 and outer cylindrical steel wall 47. The upper part of cylindrical wall 47 is flared outwardly by conical upper section 48 to coincide with the inside diameter of the pit opening at operating floor 37.

Under operating conditions trucks carrying refuse to the plant will arrive on the operating floor 37 in which scales 38 are located. The trucks back in on scales until the rear wheel of the truck touches the bumper 41. Each truck will then dump its load into receiving hopper 45 and turntable 42, being in continuous rotating motion, will carry the discharged load circumferentially around within the hopper sides 46 and 47 to the point of tangential discharge. At this point, outer wall 47 of the hopper does not follow its otherwise cylindrical shape, but has a straight section extending tangentially to the intake opening of a large hammermill type shredder 50. Directly opposing the tangential section of side 47 is a vertical tangential discharge guide 49 which prevents the burden of refuse on turntable 42 from being carried on around on its rotating path. When the burden reaches discharge guide 49, it is guided into the intake chute 51 of the hammermill and is shredded to small pieces.

Compression feeder 52 located immediately below chute 51 controls the rate of flow of material into the hammermill shredder 50 to provide an even feed of the hammermill. A controlled volume of intermediate velocity air flow is provided by fan 53 to be carried through the hammermill and the hammermill discharge chute during the shredding operation in order to pneumatically carry out dust and very light shredded particles from the interior of the hammermill and the chute area. These materials are pneumatically carried through duct 54 to cyclone separators 55 for further conveyance to the furnace intake hoppers. This pneumatic conveyance provides efficient and clean handling facilities for the very light weight and bulky materials and at the same time maintains the interior of the hammermill purged and free of any excessive dust loading during the shredding operation and thereby prevents the tendency for dust explosions during the operation. The heavier shredded particles which are not carried away by the pneumatic conveying system are discharged onto the vibrating feeder 56 below the discharge chute 57 of the hammermill. Magnetic separator 56' is located at the discharge point of vibrating feeder 56 and as the flow of the shredded materials pass over the magnetic separator the ferrous parts are separated from the rest of the bulk of the material and discharged through discharge chute 58 to a conventional bucket elevator carrying the shredded ferrous parts to a waiting truck on the operating floor 37 above.

The non-ferrous balance of the material discharged by the vibrating feeder 56 is deposited on rotary turntable feeder 59 from which plow 60 discharges the entire material flow onto belt conveyor system 61 through hopper 62. Belt conveyor system 61 carries the entire material flow around and upward to diverter chute 63 at the intake point of the furnaces. Furnace charging hoppers 64 receive the material from diverter chute 63 above and discharge the material flow through their bottom outlets to rotary air lock feeders 65 which in turn deposit it into pneumatic furnace feed tube 66 through which a high pressure preheated air stream injects the material into the primary combustion chamber 10 of the furnace through refractory lined injection port 67. If the material flow into hopper 64 exceeds that which is required for the operation of the furnaces, the overflow material will drop to the storage floor 68 below and gradually accumulate there until the material flow into hopper 64 decreases to a point less than that required for the operation of the furnace. At that time the automatic control system will activate travelling screw unloaded 69 which will proceed to discharge the deposited overflow material from the storage floor to rotary feeder 59 which in turn will carry it to plow 60 and make it available for the furnace feeding equipment starting with mechanical belt conveyor 61. The light weight pneumatically conveyed material from the shredder which was deposited in cyclone separators 55 is continually discharged from cyclones 55 to belt conveyors 61 and is thus continuously mixed in as a portion of the furnace feed material.

The flow of material described above generally applies most directly to garbage containing material providing for continuous and immediate disposal of all types of putrescible materials, to prevent the breeding of vermin and insects, and the development of obnoxious odors. In order to provide good continuity of operation for the entire plant, however, non-putrescible materials such as demolition debris and industrial and commercial waste, for example: broken pallets, shipping cartons, timbers and discarded ornamental trees and automotive tires and the like are continually received during the course of the day and shredded by the hammermill shredder located on the opposite side of the plant. All of the materials shredded in that shredder are handled, separated, and conveyed in the same manner as described above for putrescible materials, however, instead of being deposited into the furnace charging hopper 64 these materials are deposited by conveyor system 61 onto upper rotary distribution table feeder 70 from which it is discharged into the demolition or refuse storage area 71 for later use. When the receipt of municipal refuse or the like ceases at the end of the day, the automatic furnace control system will initiate continuous operation of screw unloaders 72 which will proceed to deliver the stored shredded material to rotary feder table 59 which in turn will carry it to plows 60 and thereby bring this material flow into the furnace charging system.

Intake fans 73 located on the fan floor 75 are connected through a conventional duct system to high velocity intake manifolds 74 at the top of the material receiving hopper 45. Dust and odors which are whirling upward during the process of dumping the material content of the trucks into the hopper is entrained in the higher velocity air stream entering manifold 74 preventing the dust and odor from dispersing throughout the plant operating area and its surroundings. The dust and odor-laden air is carried through cyclone separators 55 for primary cleaning and thereafter through high efficiency scrubber 76 for final cleaning before this air is delivered to the intake side of the furnace combustion fans 77 for delivery to the furnace as combustion air. Prior to being introduced into the furnace this air is carried through conventional ducting to the air heater section 78 of steam boiler 22 located above the furnace. After having been preheated to approximately 600° F. this preheated combustion air is returned to the furnace through duct 79 and injected tangentially at a very high velocity into the furnace for combustion purposes through air injection ports 80. A portion of this combustion air is also being delivered to gas burners 81 which are continually providing a very high temperature flame impingement on the injected stream of shredded material entering through material injection port 67, providing a continuous, fast and reliable ignition of all of the injected materials.

The entire operation of the furnaces, the boilers and all of their feeding systems are controlled by a number of electronic analog control systems, which generally base their control requirements on the desired steam output from the steam generation facilities at any time of the operating cycle. Inasmuch as steam production demands very exacting temperature and combustion control performance of the furnace equipment, the time delays which would be encountered in changing the material feed flow from one mechanical feeding system to the other would be very detrimental to the operation of the plant. In order to provide a smooth control pattern from a temperature and heat release standpoint, therefore, the burners 81 and natural gas inlets provided at air injection ports 80 are connected to automatic proportioning fuel control systems which by means of regulating the exact amount of gas flow to these inlets will maintain a completely accurate temperature distribution and heat release condition within the furnace at any time, preventing undesirable fluctuations at the inlet to the steam boiler 22 above the furnace. As the result of this system, if the heat input from the shredded fuel injected through injection port 67 should drop below the furnace requirements at any one time, the proportions control system will automatically make-up the variation by introducing an additional amount of natural gas through these various burners, thereby maintaining stable combustion conditions. However, as son as any excessive amount of gas is being used in this manner, a sequence control system will immediately initiate the operation of one of the traveling screw unloaders located in the storage areas, until the fuel requirements have been met, by introduction of shredded refuse from one of these sources.

The controlling operation of the entire plant is performed by a multitude of electronically controlled instruments 35 and associated equipment located in the control room 33 within the roof structure above the operating floor. The twenty truck scales 38 which are built into the surface of the operating floor 37 are all electronically operated scales, the operation of which are controlled by the computer in the control room. Four operators in the control room each control the operation of five scales keeping track of which materials are discharged into the receiving hopper and by control removing explosives or other undesirable items from being fed into the shredders. Elevator 40 provides access and egress from the control room and offices located within the roof structure.

While I have illustrated and described a presently preferred practice and embodiment of my invention, it will be understood that it may be otherwise embodied within the scope of the following claims.

I claim:
1. An incineration apparatus comprising at least one main combustion chamber in the form of a cylinder on a substantially horizontal axis, converging at its discharge end into a reduced cross-section throat opening and joined tangentially to the base of a secondary combustion chamber in the form of a cylinder with a substantially vertical axis, means for axially introducing refuse to be incinerated together with preheated air axially into the main combustion chamber are provided adjacent the top of the main combustion chamber, means connected to said main combustion chamber for introducing a high calorific fuel to said main combustion chamber, means connected to said main combustion chamber for introducing selectively preheated air under pressure into said main combustion chamber and means for discharging molten residue from the combustion process from the apparatus adjacent the junction of the main and secondary combustion chambers.

2. An incinerating apparatus as claimed in claim 1 having a refuse receiving station adjacent the furnace, shredder means receiving refuse from said receiving station and reducing the same to a selected size range, a source of high pressure air, a shredded refuse delivery system connecting said source of high pressure air and said shredder means to said means for introducing refuse to the main combustion chamber.

3. The method of incinerating refuse materials by the steps of (a) injecting refuse material pnuematically into a generally cylindrical horizontal axis high temperature combustion chamber; (b) impinging the injected stream of material and primary air by combustion products from a source of high calorific fuel to cause ignition of the refuse stream; (c) tangentially impinging the ignited stream of refuse and products of combustion by preheated secondary combustion air introduced tangentially at a high velocity to cause high heat release and to force relatively slower burning particles against the hot refractory furnace walls to increase their residence time in the furnace and assure complete combustion while being scrubbed by hot gases and preheated combustion air, passing at very high relative velocities; and (d) discharging the products of combustion through a narrow throat section tangentially into a secondary generally cylindrical vertical axis combustion chamber at a high velocity to assure complete combustion prior to exhausting from the furnace.

4. The method of cleaning hot flue gases in a combustion process by removing non-combustible particulates by centrifugal (cyclonic) wet collection at approximately 3000° F. by the steps of (a) introducing the particles pneumatically in preheated air combined in a stream of combustible materials; (b) subjecting all of the particles to violent turbulence and extremely high heat release, thereby instantly melting all solid non-combustibles; (c) thereafter forcing all particles into an extremely high angular velocity helical flow pattern, causing the molten non-combustibles to be deposited by centrifugal force on the cylindrical hot refractory walls, from which the collected molten slag will run down to the discharge point; and (d) discharging the total volume of flue gases from the primary combustion chamber at high velocity through a narrow, smooth flow throat section tangentially into the lower section of a cylindrical secondary combustion chamber with a vertical axis.

5. The method as claimed in claim 4 wherein the products of combustion are passed through a heat exchanger following the secondary combustion chamber where the heat is converted to steam in the exchanger and the gases are thereafter discharged to atmosphere.

References Cited
UNITED STATES PATENTS

| | | | |
|---|---|---|---|
| 1,059,787 | 4/1913 | Uhde | 110—8 |
| 3,064,593 | 11/1962 | Burk et al. | 110—8 |
| 3,312,183 | 4/1967 | Kells et al. | 110—8 |
| 3,413,937 | 12/1968 | Bojner et al. | 110—8 XR |

FREDERICK L. MATTESON, JR., Primary Examiner

R. A. DUA, Assistant Examiner